United States Patent
Zheng et al.

(10) Patent No.: US 11,332,937 B1
(45) Date of Patent: May 17, 2022

(54) ROOFING MEMBRANE WITH PROTRUSIONS

(71) Applicant: BMIC LLC, Dallas, TX (US)

(72) Inventors: Yan Zheng, Livingston, NJ (US); Yixi Xiao, Edison, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/508,347

(22) Filed: Oct. 22, 2021

Related U.S. Application Data

(60) Provisional application No. 63/104,993, filed on Oct. 23, 2020.

(51) Int. Cl.
| | |
|---|---|
| *E04D 5/02* | (2006.01) |
| *B29C 44/02* | (2006.01) |
| *B29C 44/18* | (2006.01) |
| *B29C 44/12* | (2006.01) |
| *B29L 31/10* | (2006.01) |
| *B29L 7/00* | (2006.01) |

(52) U.S. Cl.
CPC .............. *E04D 5/02* (2013.01); *B29C 44/022* (2013.01); *B29C 44/1209* (2013.01); *B29C 44/186* (2013.01); *B29L 2007/001* (2013.01); *B29L 2031/108* (2013.01)

(58) Field of Classification Search
CPC . B29C 44/022; B29C 44/1209; B29C 44/186; E04D 5/02
USPC .............................................. 52/408, 411, 413
See application file for complete search history.

(56) References Cited

U.S. PATENT DOCUMENTS

| | | | | |
|---|---|---|---|---|
| 4,320,162 A | * | 3/1982 | Schulz | B31F 1/07 428/154 |
| 4,518,643 A | * | 5/1985 | Francis | B29C 59/022 428/131 |
| 4,631,221 A | * | 12/1986 | Disselbeck | B32B 5/026 428/166 |
| 5,374,477 A | * | 12/1994 | Lawless | E04B 1/6809 428/317.3 |
| 5,453,142 A | * | 9/1995 | Klein | B29C 63/04 156/201 |
| 5,626,936 A | * | 5/1997 | Alderman | F24S 20/61 428/68 |
| 5,770,295 A | * | 6/1998 | Alderman | F24S 20/61 428/68 |

(Continued)

FOREIGN PATENT DOCUMENTS

WO  2010-070466 A1  6/2010

*Primary Examiner* — James M Ference
(74) *Attorney, Agent, or Firm* — Greenberg Traurig, LLP

(57) ABSTRACT

Some embodiments of the present disclosure relate roofing membranes that may include at least one first layer including a first plurality of protrusions; at least one second layer including a second plurality of protrusions; and a plurality of inner regions disposed between a raised protrusion of the first plurality of protrusions and a raised protrusion of the second plurality of protrusions. Some embodiments of the present disclosure relate to methods of forming roofing membranes. The methods may include applying a blowable ink onto at least one porous layer; sandwiching the at least one porous layer between the at least one first layer and the at least one second layer; and expanding the blowable ink, so as to form the first plurality of protrusions, the second plurality of protrusions, and the plurality of inner regions.

17 Claims, 4 Drawing Sheets

(56) References Cited

U.S. PATENT DOCUMENTS

| | | | | |
|---|---|---|---|---|
| 5,919,556 A * | 7/1999 | Barnholtz | B32B 29/08 | 428/218 |
| 6,221,463 B1 * | 4/2001 | White | B01D 53/885 | 428/174 |
| 6,645,598 B2 * | 11/2003 | Alderman | B29C 65/18 | 428/69 |
| 6,786,013 B2 * | 9/2004 | Coulton | B32B 3/28 | 405/45 |
| 6,925,766 B2 * | 8/2005 | Di Pede | B32B 3/30 | 52/408 |
| 6,926,947 B1 * | 8/2005 | Seckel | B32B 1/00 | 206/585 |
| 7,753,254 B2 * | 7/2010 | Straza | B23K 1/008 | 228/193 |
| 8,018,655 B2 * | 9/2011 | Sacks | B32B 37/1284 | 359/619 |
| 8,156,703 B2 * | 4/2012 | Alderman | B32B 3/12 | 52/309.13 |
| 8,919,061 B2 * | 12/2014 | Kortuem | E02D 31/02 | 52/302.3 |
| 9,144,954 B2 * | 9/2015 | Xiang Li | B32B 5/024 | |
| 10,265,928 B2 * | 4/2019 | Takano | B29C 66/438 | |
| 10,293,981 B2 * | 5/2019 | Borchardt | B31B 70/10 | |
| 10,301,828 B2 | 5/2019 | Shepherd | | |
| 10,487,496 B2 * | 11/2019 | Alderman | E04B 1/7662 | |
| 10,676,918 B2 * | 6/2020 | Caruso | B32B 27/14 | |
| 2004/0055240 A1 | 3/2004 | Kiik et al. | | |
| 2007/0248817 A1 * | 10/2007 | Sieber | C09J 7/22 | 428/343 |
| 2008/0092474 A1 * | 4/2008 | Gan | E04D 12/002 | 52/413 |
| 2008/0248244 A1 | 10/2008 | Kalkanoglu et al. | | |
| 2010/0048752 A1 * | 2/2010 | Vignola | C08L 31/04 | 521/139 |
| 2010/0227103 A1 | 9/2010 | Hohmann, Jr. | | |
| 2012/0247040 A1 * | 10/2012 | Buoni | E04F 13/047 | 52/302.1 |
| 2014/0103563 A1 * | 4/2014 | Gray | B29C 48/21 | 264/101 |
| 2014/0335321 A1 * | 11/2014 | Reisman | B32B 3/30 | 428/172 |
| 2016/0229095 A1 * | 8/2016 | Mori | G01N 3/56 | |
| 2017/0362830 A1 * | 12/2017 | Buckingham | B32B 27/06 | |

* cited by examiner

ROOFING MEMBRANE WITH PROTRUSIONS

CROSS-REFERENCE TO RELATED APPLICATIONS

This application claims priority to U.S. Provisional Application No. 63/104,993, filed on Oct. 23, 2020, the entire contents of which are incorporated herein by reference.

FIELD

The present disclosure relates to roofing membranes and methods of manufacturing the roofing membranes.

BACKGROUND

Traditional roofing systems may include roofing membranes. Some roofing membranes include liquid coatings that cure, and may be used to form a protective membrane in roofing systems.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure are directed to a roofing membrane comprising a first layer comprising a first liquid applied roof coating, and a first plurality of raised protrusions; a second layer comprising a second liquid applied roof coating, and a second plurality of raised protrusions; a porous layer between the first layer and the second layer; and a plurality of inner regions, wherein a first one of the plurality of inner regions forms a first one of the first plurality of raised protrusions and a first one of the second plurality of raised protrusions, wherein a second one of the plurality of inner regions forms a second one of the first plurality of raised protrusions and a second one of the second plurality of raised protrusions, wherein a third one of the plurality of inner regions forms a third one of the first plurality of raised protrusions and a third one of the second plurality of raised protrusions, and wherein the plurality of inner regions are foam, hollow, or any combination thereof; and wherein the roofing membrane is configured to be applied to a roof substrate.

In some embodiments, the porous layer is a woven or non-woven fabric, a scrim, a fleece, a mesh, open cell foams, or any combination thereof.

In some embodiments, the first liquid applied roof coating comprises silicone, acrylic, polyurethane, epoxy, polymethylmethacrylate, silane terminated polymers, polyvinylidene fluoride, polyvinylidene difluoride, or any combination thereof.

In some embodiments, the second liquid applied roof coating comprises silicone, acrylic, polyurethane, epoxy, polymethylmethacrylate, silane terminated polymers, polyvinylidene fluoride, polyvinylidene difluoride, or any combination thereof.

In some embodiments, the first liquid applied roof coating and the second liquid applied roof coating are the same.

In some embodiments, the first liquid applied roof coating and the second liquid applied roof coating are different.

Some embodiments of the present disclosure are directed to a method comprising obtaining a porous substrate, wherein the porous substrate has a top surface and a bottom surface; applying a blowable ink onto at least a portion of the top surface of the porous substrate or the bottom surface of the porous substrate; coating the top surface of the porous substrate with a first liquid applied coating; coating the bottom surface of the porous substrate with a second liquid applied coating; expanding the blowable ink, so as to form a first plurality of protrusions, wherein the first plurality of protrusions is present on the top surface of the porous substrate; a second plurality of protrusions, and a plurality of inner regions, wherein each of the plurality of inner regions is disposed between the first liquid applied coating and the second liquid applied coating and extend through the porous substrate.

In some embodiments, the at least one the porous layer is a woven or non-woven fabric, a scrim, a fleece, a mesh, or open cell foams.

In some embodiments, the at least one porous layer is configured to at least partially absorb the blowable ink.

In some embodiments, the first liquid applied coating is the same as the second liquid applied coating.

In some embodiments, first liquid applied coating is different from the second liquid applied coating.

In some embodiments, the first liquid applied roof coating comprises silicone, acrylic, polyurethane, epoxy, polymethylmethacrylate, silane terminated polymers, polyvinylidene fluoride, polyvinylidene difluoride, or any combination thereof.

In some embodiments, the second liquid applied roof coating comprises silicone, acrylic, polyurethane, epoxy, polymethylmethacrylate, silane terminated polymers, polyvinylidene fluoride, polyvinylidene difluoride, or any combination thereof.

In some embodiments, the plurality of inner regions comprises foam.

In some embodiments, the plurality of inner regions is hollow.

In some embodiments, expanding the blowable ink includes heating the blowable ink at a temperature from 100° C. to 150° C.

In some embodiments, expanding the blowable ink includes heating the blowable ink from 1 minute to 5 minutes.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
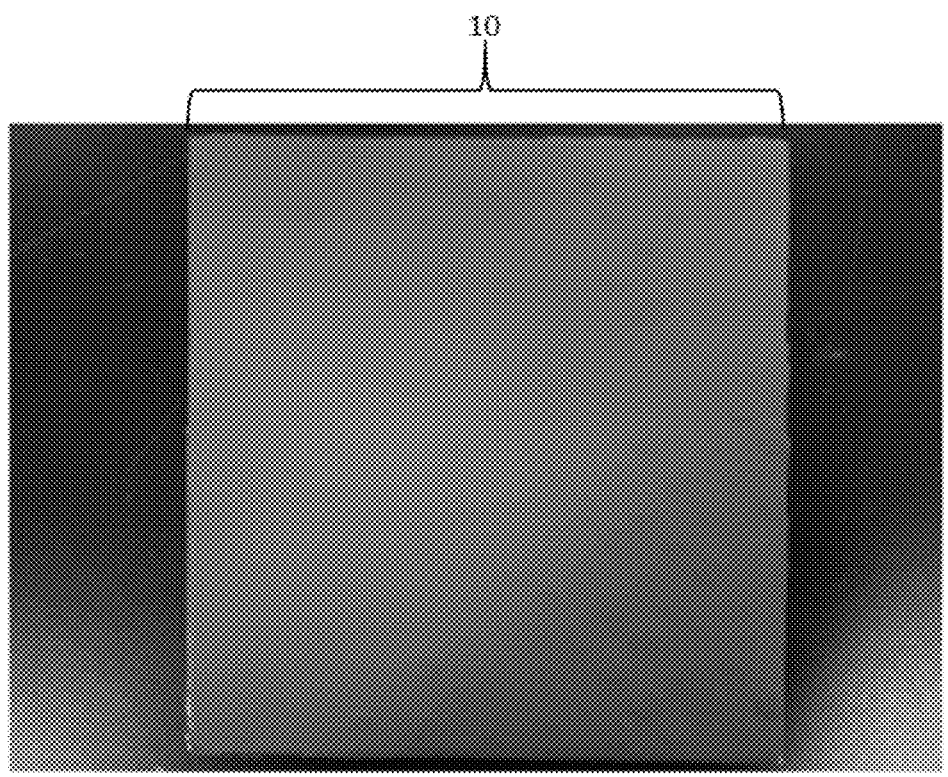
FIG. 1 depicts an exemplary embodiment of a roofing membrane according to the present disclosure.

Among those benefits and improvements that have been disclosed other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "blowing agent" means any material that, following exposure of the material to a certain temperature for a certain period of time, is configured to increase in volume by a specific amount. In some embodiments the blowing agent may be configured to increase in volume from 100% to 10,000%, from 500% to 10,000%, from 1,000% to 10,000%, from 1,500% to 10,000%, from 2,000% to 10,000%, from 2,500% to 10,000%, from 3,000% to 10,000%, from 3,500% to 10,000%, from 4,000% to 10,000%, from 4,500% to 10,000%, from 5,000% to 10,000%, from 5,500% to 10,000% from 6,000% to 10,000%, from 6,500% to 10,000%, from 7,000% to 10,000%, from 7,500% to 10,000%, from 8,000% to 10,000%, from 8,500% to 10,000%, from 9,000% to 10,000%, or from 9,500% to 10,000%.

In some embodiments, the blowing agent may be configured to increase in volume from 100% to 10,000%, from 100% to 9,500%, from 100% to 9,000%, from 100% to 8,500%, from 100% to 8,000%, from 100% to 7,500%, from 100% to 7,000%, from 100% to 6,500%, from 100% to 6,000%, from 100% to 5,500%, from 100% to 5,000%, from 100% to 4,500% from 100% to 4,000%, from 100% to 3,500%, from 100% to 3,000%, from 100% to 2,500%, from 100% to 2,000%, from 100% to 1,500%, from 100% to 1,000%, or from 100% to 500%.

In some embodiments, the blowing agent may be configured to increase in volume from 100% to 10,000%, from 500% to 9,500%, from 1,000% to 9,000%, from 1,500% to 8,500%, from 2,000% to 8,000%, from 2,500% to 7,500%, from 3,000% to 7,000%, from 3,500% to 6,500%, from 4,000% to 6,000%, or from 4,500% to 5,500%.

In some embodiments, a "blowing agent" may increase in volume by at least one of the following mechanisms, such as, but not limited to, decomposing and releasing a gas, converting from a condensed phase to a gas phase, expanding to form a foam, or any combination thereof.

As used herein, the term "matrix material" means a liquid, gel, paste, or combination thereof that is configured to cure into a solid form via evaporation of at least one solvent from the matrix material, heating the matrix material, thermoplastic cooling, thermoset setting, chemical curing, photocuring, radiation curing, or any combination thereof.

As used herein, the term "blowable ink" means a composition including a matrix material and a blowing agent.

As used herein, the term "liquid applied roof coating" means all liquid coatings disclosed in U.S. patent application Ser. No. 16/739,609, titled "Liquid Applied Roofing System with Improved Moisture Barrier Layer," filed on Jan. 10, 2020, the entirety of which is incorporated herein by reference. including silicone coatings, acrylic coatings, polyurethane coatings, epoxy, polymethylmethacrylate (PMMA), silane terminated polyethers (STP), or combinations thereof.

As used herein, the term "foam" means a mass of bubbles.

Some embodiments of the present disclosure relate to a roofing membrane. In some embodiments, the roofing membrane may be configured to be directly or indirectly attached to a roof substrate. In some embodiments, the roof substrate may include including, without limitation, a plywood roof substrate, a glass roof substrate, a cellulosic roof substrate, a roofing shingle, a glass mat, a fiberglass mat, an underlayment, a roofing membrane, a roof deck, a photovoltaic (PV) panel, a modified bitumen (MODBIT) substrate, a roll good, a chimney, a polyisocyanurate (ISO) foam board, or any combination thereof. In some embodiments, the roofing membrane may be configured to be attached to the roof substrate using any suitable means known to those skilled in the art including nails, staples, adhesives, or any combination thereof.

In some embodiments, the roofing membrane may be structured such that it may be configured to provide improved impact resistance. In some embodiments, the roofing membrane may be structured such that the roofing membrane may be configured to provide improved thermal insulation.

In some embodiments the roofing membrane may include at least one layer of material. For example, in some embodiments, the roofing membrane may include a first layer and a second layer. In some embodiments, the first and second layers may be formed of any suitable materials known to those skilled in the art that may be configured to form a roofing membrane. In some embodiments, the first and second layers may be formed of the same material. In some embodiments, the first and second layers may be formed of different materials.

In some embodiments, the first layer may be a porous layer. In some embodiments, the second layer may be a porous layer. In some embodiments, the porous layer may be a woven or non-woven fabric, a scrim, a sheet of fleece-like materials, a mesh, open cell foams, or any combination thereof.

In some embodiments, the first layer may be a first liquid applied roof coating. In some embodiments the second layer may be a second liquid applied roof coating. In some embodiments, the liquid applied roof coating may include silicone, acrylic, polyurethane, epoxy, polymethylmethacrylate, silane terminated polymers, polyvinylidene fluoride, polyvinylidene difluoride, or any combination thereof. For example, in some embodiments, the liquid applied coating may be a commercially available liquid applied roof coating, including Unisil HS silicone roof coating and HydroStop®, each provided by GAF® Materials Corporation.

In some embodiments, the first liquid applied roof coating may be the same as the second liquid applied roof coating. In some embodiments, the first liquid applied roof coating may be different from the second liquid applied roof coating.

In some embodiments, the first layer has a thickness sufficient so as to permit protrusions to be formed therein.

In some embodiments, a thickness of the first layer may be from 5 mil to 50 mil, from 5 mil to 45 mil, from 5 mil to 40 mil, from 5 mil to 35 mil, from 5 mil to 30 mil, from 5 mil to 25 mil, from 5 mil to 20 mil, from 5 mil to 15 mil, or from 5 mil to 10 mil.

In some embodiments, a thickness of the first layer may be from 5 mil to 50 mil, from 10 mil to 50 mil, from 15 mil to 50 mil, from 20 mil to 50 mil, from 25 mil to 50 mil, from 30 mil to 50 mil, from 35 mil to 50 mil, from 40 mil to 50 mil, or from 45 mil to 50 mil.

In some embodiments, a thickness of the first layer may be from 5 mil to 50 mil, from 10 mil to 45 mil, from 15 mil to 40 mil, from 20 mil to 35 mil, or from 25 mil to 30 mil.

In some embodiments, a thickness of the second layer may be from 5 mil to 50 mil, from 5 mil to 45 mil, from 5 mil to 40 mil, from 5 mil to 35 mil, from 5 mil to 30 mil, from 5 mil to 25 mil, from 5 mil to 20 mil, from 5 mil to 15 mil, or from 5 mil to 10 mil.

In some embodiments, the second layer has a thickness sufficient so as to permit protrusions to be formed therein.

In some embodiments, a thickness of the second layer may be from 5 mil to 50 mil, from 10 mil to 50 mil, from 15 mil to 50 mil, from 20 mil to 50 mil, from 25 mil to 50 mil, from 30 mil to 50 mil, from 35 mil to 50 mil, from 40 mil to 50 mil, or from 45 mil to 50 mil.

In some embodiments, a thickness of the second layer may be from 5 mil to 50 mil, from 10 mil to 45 mil, from 15 mil to 40 mil, from 20 mil to 35 mil, or from 25 mil to 30 mil.

In some embodiments, the roofing membrane may include at least one porous layer. In some embodiments, the at least one porous layer may be between the first and second layers of the roofing membrane. In some embodiments, the porous layer may be any suitable material known to those skilled in the art that may be configured to at least partially absorb a blowable ink (as disclosed herein). For example, in some embodiments, the porous layer may be a woven or non-woven fabric, a scrim, a fleece, a mesh, an open cell foam, or any combination thereof.

In some embodiments, the blowable ink may comprise a blowing agent and a matrix material. In some embodiments, the ratio of the blowing agent to the matrix material may be from 1:10 to 10:1, from 1:10 to 9:1, from 1:10 to 8:1, from 1:10 to 7:1, from 1:10 to 6:1, from 1:10 to 5:1, from 1:10 to 4:1 from 1:10 to 3:1, from 1:10 to 2:1, or from 1:10 to 1:1.

In some embodiments, the ratio of the blowing agent to the matrix material may be from 1:10 to 10:1, from 1:9 to 10:1, from 1:8 to 10:1, from 1:7 to 10:1, from 1:7 to 10:1, from 1:6 to 10:1, from 1:5 to 10:1, from 1:4 to 10:1, from 1:3 to 10:1, from 1:2 to 10:1, or from 1:1 to 10:1.

In some embodiments, the ratio of the blowing agent to the matrix material may be from 1:10 to 10:1, from 1:9 to 9:1, from 1:8 to 8:1, from 1:7 to 7:1, from 1:6 to 6:1, from 1:5 to 5:1, from 1:4 to 4:1, from 1:3 to 3:1, or from 1:2 to 2:1.

In some embodiments, the blowing agent may be configured to increase in volume from 100% to 10,000%, from 500% to 10,000%, from 1,000% to 10,000%, from 1,500% to 10,000%, from 2,000% to 10,000%, from 2,500% to 10,000%, from 3,000% to 10,000%, from 3,500% to 10,000%, from 4,000% to 10,000%, from 4,500% to 10,000%, from 5,000% to 10,000%, from 5,500% to 10,000% from 6,000% to 10,000%, from 6,500% to 10,000%, from 7,000% to 10,000%, from 7,500% to 10,000%, from 8,000% to 10,000%, from 8,500% to 10,000%, from 9,000% to 10,000%, or from 9,500% to 10,000%.

In some embodiments, the blowing agent may be configured to increase in volume from 100% to 10,000%, from 100% to 9,500%, from 100% to 9,000%, from 100% to 8,500%, from 100% to 8,000%, from 100% to 7,500%, from 100% to 7,000%, from 100% to 6,500%, from 100% to 6,000%, from 100% to 5,500%, from 100% to 5,000%, from 100% to 4,500% from 100% to 4,000%, from 100% to 3,500%, from 100% to 3,000%, from 100% to 2,500%, from 100% to 2,000%, from 100% to 1,500%, from 100% to 1,000%, or from 100% to 500%.

In some embodiments, the blowing agent may be configured to increase in volume from 100% to 10,000%, from 500% to 9,500%, from 1,000% to 9,000%, from 1,500% to 8,500%, from 2,000% to 8,000%, from 2,500% to 7,500%, from 3,000% to 7,000%, from 3,500% to 6,500%, from 4,000% to 6,000%, or from 4,500% to 5,500%.

In some embodiments, the blowing agent may be configured to increase in volume by decomposing and releasing a gas, converting from a condensed phase to a gas phase, expanding to form a foam, or any combination thereof.

In some embodiments, the blowing agent may be configured to increase in volume when exposed to a threshold temperature. In some embodiments, the threshold temperature may be from 100° C. to 200° C., from 100° C. to 190° C., from 100° C. to 180° C., from 100° C. to 170° C., from 100° C. to 160° C., from 100° C. to 150° C., from 100° C. to 140° C., from 100° C. to 130° C., from 100° C. to 120° C., or from 100° C. to 110° C.

In some embodiments, the threshold temperature may be from 100° C. to 200° C., from 110° C. to 200° C., from 120° C. to 200° C., from 130° C. to 200° C., from 140° C. to 200° C., from 150° C. to 200° C., from 160° C. to 200° C., from 170° C. to 200° C., from 180° C. to 200° C., or from 190° C. to 200° C.

In some embodiments, the threshold temperature may be from 100° C. to 200° C., from 110° C. to 190° C., from 120° C. to 180° C., from 130° C. to 170° C., or from 140° C. to 160° C.

In some embodiments, the blowing agent may be configured to increase in volume when exposed to the threshold temperature for 30 seconds to 10 minutes, for 1 minute to 10 minutes, for 2 minutes to 10 minutes, for 3 minutes to 10 minutes, for 4 minutes to 10 minutes, for 5 minutes to 10 minutes, for 6 minutes to 10 minutes, for 7 minutes to 10 minutes, for 8 minutes to 10 minutes, or for 9 minutes to 10 minutes.

In some embodiments, the blowing agent may be configured to increase in volume when exposed to the threshold temperature for 30 seconds to 10 minutes, for 30 seconds to 9 minutes, for 30 seconds to 8 minutes, for 30 seconds to 7 minutes, for 30 seconds to 6 minutes, for 30 seconds to 5 minutes, for 30 seconds to 4 minutes, for 30 seconds to 3 minutes, for 30 seconds to 2 minutes, or for 30 seconds to 1 minute.

In some embodiments, the blowing agent may be configured to increase in volume when exposed to the threshold temperature for 30 seconds to 10 minutes, for 1 minute to 9 minutes, for 2 minutes to 8 minutes, for 3 minutes to 7 minutes, or for 4 minutes to 6 minutes.

In some embodiments, the matrix material in the blowable ink may include a liquid, gel, paste, or combination thereof. In some embodiments, the blowable ink is e configured to cure into a solid form via evaporation of at least one solvent in the matrix material, heating the matrix material, thermoplastic cooling, thermoset setting, chemical cur, photo/radiation cur, or any combination thereof. In some embodiments, the matrix material may be a liquid applied roof coating.

In some embodiments the matrix material may have a viscosity from 10 cps to 10,000,000 cps, from 100 cps to 10,000,000 cps, from 1,000 cps to 10,000,000 cps, from 10,000 cps to 10,000,000 cps, from 100,000 cps to 10,000,000 cps, or from 1,000,000 cps to 10,000,000 cps.

In some embodiments the matrix material may have a viscosity from 10 cps to 10,000,000 cps, from 10 cps to 1,000,000 cps, from 10 cps to 100,000 cps, from 10 cps to 10,000 cps, from 10 cps to 1,000 cps, or from 10 cps to 100 cps.

In some embodiments the matrix material may have a viscosity from 10 cps to 10,000,000 cps, from 100 cps to 1,000,000 cps, or from 1,000 cps to 100,000 cps.

In some embodiments, the roofing membrane may further include a plurality of protrusions. In some embodiments, the first layer may include a first plurality of protrusions. In some embodiments, the second layer may include a second plurality of protrusions.

In some embodiments, the first and second plurality of protrusions may be shaped so as to increase impact resistance of the roofing membrane. In some embodiments, the first and second plurality of protrusions may be shaped so as to increase insulation of the roofing membrane. In some embodiments, the first and second plurality of protrusions may be shaped so as to increase both impact resistance and insulation of the roofing membrane. In some embodiments, the first plurality of protrusions may be shaped as lines, dots, spirals, circles or other round shapes, squares or other polygonal shapes, or any combination thereof. In some embodiments, the second plurality of protrusions may be shaped as lines, dots, spirals, circles or other round shapes, squares or other polygonal shapes, or any combination thereof. In some embodiments, the first plurality of protrusions may have the same shape as the second plurality of protrusions. In some embodiments, the first plurality of protrusions may have a different shape than the second plurality of protrusions.

In some embodiments, the plurality of protrusions may include a length from 0.25" to 2", from 0.5" to 2", from 0.75" to 2", from 1" to 2", from 1.25" to 2", from 1.5" to 2", or from 1.75" to 2".

In some embodiments, the plurality of protrusions may include a length from 0.25" to 2", from 0.25" to 1.75", from 0.25" to 1.5", from 0.25" to 1.25", from 0.25" to 1", from 0.25" to 0.75", or from 0.25" to 0.5".

In some embodiments, the plurality of protrusions may include a length from 0.25" to 2", from 0.5" to 1.75", from 0.75" to 1.5", or from 1" to 1.25".

In some embodiments, the roofing membrane may include a plurality of inner regions. In some embodiments, each of the plurality of inner regions may be enclosed by a respective one of the plurality of the protrusions on the first layer. In some embodiments, each of the plurality of inner regions may be enclosed by a respective one of the plurality of protrusions on the second layer. In some embodiments, each of the plurality of inner regions may be disposed between a raised protrusion of the first plurality of protrusions on the first layer and a raised protrusion of the second plurality of protrusions on the second layer, such that each inner region may be enclosed by a respective one of the first plurality of protrusions and a respective one of the second plurality of protrusions.

In some embodiments, the plurality of inner regions may include a liquid, gas, solid, or any combination thereof. For example, in some embodiments, the inner regions may be hollow regions filled with a gas. In other embodiments, the inner regions may be filled with a foam.

Some embodiments of the present disclosure relate to methods. In some embodiments, the methods may be methods of forming roofing membranes, including the liquid applied roofing membranes disclosed herein. In some embodiments, the method may include applying a blowable ink onto the at least one porous layer. In some embodiments, the blowable ink may be applied in any suitable manner known to those skilled in the art, including spraying, rolling, brushing, die coating, or any combination thereof. In some embodiments, the blowable ink may be applied to a top surface of the porous layer. In some embodiments, the blowable ink may be applied to a bottom surface of the porous layer. In some embodiments, the blowable ink may be applied to both the top and bottom surfaces of the porous layer.

In some embodiments, the blowable ink may be applied to at least one portion of the porous layer, such that the blowable ink may not cover the entirety of the porous layer. In some embodiments, the blowable ink may be applied to a plurality of portions of the porous layer. In some embodiments, the plurality of portions of the porous layer may be spaced from one another, such that the blowable ink may not cover the entirety of the porous layer.

In some embodiments, the blowable ink may be applied as a pattern on the at least one porous layer. In some embodiments, the pattern may be any repeated design known to those skilled in the art, such as lines, dots, spirals, circles or other round shape, squares or other polygonal shape, or any combination thereof. For example, in some embodiments, the blowable ink may be applied in an array on the porous layer.

In some embodiments, the method may include positioning the porous layer between the first and second layers of the roofing membrane. In some embodiments, the method may include positioning the porous layer between the first and second layer after the blowable ink is applied to the porous layer. In some embodiments, the porous layer may be positioned between the first and second layers using any technique known to those skilled in the art, including lamination, extrusion, co-extrusion, coating, rolling, spraying, or any combination thereof.

In some embodiments, the method may include curing the blowable ink after it has been applied to the porous layer. In some embodiments, the method may include curing the blowable ink after the porous layer has been positioned between the first and second layers. In some embodiments, curing the blowable ink may include curing the matrix material of the blowable ink. In some embodiments, the blowable ink may be cured by evaporation of solvents, coalescent, thermoplastic cooling, thermoset setting, chemical curing, photo/radiation curing, or any combination thereof.

In some embodiments, the method may include expanding the blowable ink. In some embodiments, the blowable ink may be expanded after curing the first and second layers of the roofing membrane. In some embodiments, expanding the blowable ink may form the first plurality of protrusions on the first layer of the roofing membrane. In some embodiments, expanding the blowable ink may form the second plurality of protrusions on the second layer of the roofing membrane. In some embodiments, expanding the blowable ink may form the first and second pluralities of protrusions on the first and second layers of the roofing membrane.

As described herein, in some embodiments, the blowable ink may be applied in a pattern on the porous layer. In some embodiments, expanding the blowable ink may result in a first pattern of protrusions being formed on the first layer of the roofing membrane. In some embodiments, expanding the blowable ink may result in a second pattern of protrusions being formed on the second layer of the roofing membrane. In some embodiments, expanding the blowable ink may result in both a first pattern of protrusions being formed on the first layer of the roofing membrane and a second pattern of protrusions being formed on the second layer of the roofing membrane.

As described herein, in some embodiments, the roofing membrane may include a plurality of inner regions. In some embodiments, expanding the blowable ink may result in the formation of the plurality of plurality of inner regions.

In some embodiment, expanding the blowable ink may include expanding the blowing agent in the blowable ink such that the blowing agent may increase in volume from 100% to 10,000%, from 500% to 10,000%, from 1,000% to 10,000%, from 1,500% to 10,000%, from 2,000% to 10,000%, from 2,500% to 10,000%, from 3,000% to 10,000%, from 3,500% to 10,000%, from 4,000% to 10,000%, from 4,500% to 10,000%, from 5,000% to 10,000% from 6,000% to 10,000%, from 6,500% to 10,000%, from 7,000% to 10,000%, from 7,500% to 10,000%, from 8,000% to 10,000%, from 8,500% to 10,000%, from 9,000% to 10,000%, or from 9,500% to 10,000%.

In some embodiment, expanding the blowable ink may include expanding the blowing agent in the blowable ink such that the blowing agent may increase in volume from 100% to 10,000%, from 100% to 9,500%, from 100% to 9,000%, from 100% to 8,500%, from 100% to 8,000%, from 100% to 7,500%, from 100% to 7,000%, from 100% to 6,500%, from 100% to 6,000%, from 100% to 5,500%, from 100% to 5,000%, from 100% to 4,500% from 100% to 4,000%, from 100% to 3,500%, from 100% to 3,000%, from 100% to 2,500%, from 100% to 2,000%, from 100% to 1,500%, from 100% to 1,000%, or from 100% to 500%.

In some embodiment, expanding the blowable ink may include expanding the blowing agent in the blowable ink such that the blowing agent may increase in volume from 100% to 10,000%, from 500% to 9,500%, from 1,000% to 9,000%, from 1,500% to 8,500%, from 2,000% to 8,000%, from 2,500% to 7,500%, from 3,000% to 7,000%, from 3,500% to 6,500%, from 4,000% to 6,000%, or from 4,500% to 5,500%.

In some embodiments, expanding the blowing agent in the blowable ink may including exposing the roofing membrane to a threshold temperature. In some embodiments, the threshold temperature may be from 100° C. to 200° C., from 100° C. to 190° C., from 100° C. to 180° C., from 100° C. to 170° C., from 100° C. to 160° C., from 100° C. to 150° C., from 100° C. to 140° C., from 100° C. to 130° C., from 100° C. to 120° C., or from 100° C. to 110° C.

In some embodiments, the threshold temperature may be from 100° C. to 200° C., from 110° C. to 200° C., from 120° C. to 200° C., from 130° C. to 200° C., from 140° C. to 200° C., from 150° C. to 200° C., from 160° C. to 200° C., from 170° C. to 200° C., from 180° C. to 200° C., or from 190° C. to 200° C.

In some embodiments, the threshold temperature may be from 100° C. to 200° C., from 110° C. to 190° C., from 120° C. to 180° C., from 130° C. to 170° C., or from 140° C. to 160° C.

In some embodiments, expanding the blowing agent in the blowable ink may include exposing the roofing membrane to the threshold temperature for 30 seconds to 10 minutes, for 1 minute to 10 minutes, for 2 minutes to 10 minutes, for 3 minutes to 10 minutes, for 4 minutes to 10 minutes, for 5 minutes to 10 minutes, for 6 minutes to 10 minutes, for 7 minutes to 10 minutes, for 8 minutes to 10 minutes, or for 9 minutes to 10 minutes.

In some embodiments, expanding the blowing agent in the blowable ink may include exposing the roofing membrane to the threshold temperature for 30 seconds to 10 minutes, for 30 seconds to 9 minutes, for 30 seconds to 8 minutes, for 30 seconds to 7 minutes, for 30 seconds to 6 minutes, for 30 seconds to 5 minutes, for 30 seconds to 4 minutes, for 30 seconds to 3 minutes, for 30 seconds to 2 minutes, or for 30 seconds to 1 minute.

In some embodiments, expanding the blowing agent in the blowable ink may include exposing the roofing membrane to the threshold temperature for 30 seconds to 10 minutes, for 1 minute to 9 minutes, for 2 minutes to 8 minutes, for 3 minutes to 7 minutes, or for 4 minutes to 6 minutes.

In some embodiments, the blowable ink may be cured at a lower temperature than the threshold temperature at which the blowing agent in the blowable ink may be expanded.

The present disclosure will now be described with reference to non-limiting exemplary embodiments depicted in FIGS. 1-3.

FIG. 1 depicts a roofing membrane 10 according to an embodiment of the present disclosure. The roofing membrane may be a liquid applied roofing membrane. The roofing membrane 10 may include a porous layer that may be positioned between first and second layers of the roofing membrane. In the exemplary embodiment of FIG. 1, the first and second layers may be liquid applied roof coatings. For example, the first and second layers may be approximately 20 mil of Unisil HS. In addition, in the exemplary embodiment of FIG. 1, the porous layer may be a woven fabric, including for example, a glass mesh or fabric, which may be commercially available from ADFORS.

In the exemplary embodiment of FIG. 1, the porous layer may include a blowable ink printed in a pattern thereon. The pattern may be an array of round opening having a diameter of approximately 1".

In the exemplary embodiment of FIG. 1, the blowable ink may be a composition of a blowing agent and a matrix material. In the exemplary embodiment of FIG. 1, the blowing agent may be Expancel 031 DU 40, and the matrix material may be Unisil HS. In the exemplary embodiment of FIG. 1, the ratio of the blowing agent and the matrix material may be 1:1.

FIG. 1 depicts a roofing membrane 10 prior to expansion of the blowable ink.

Figure 2:
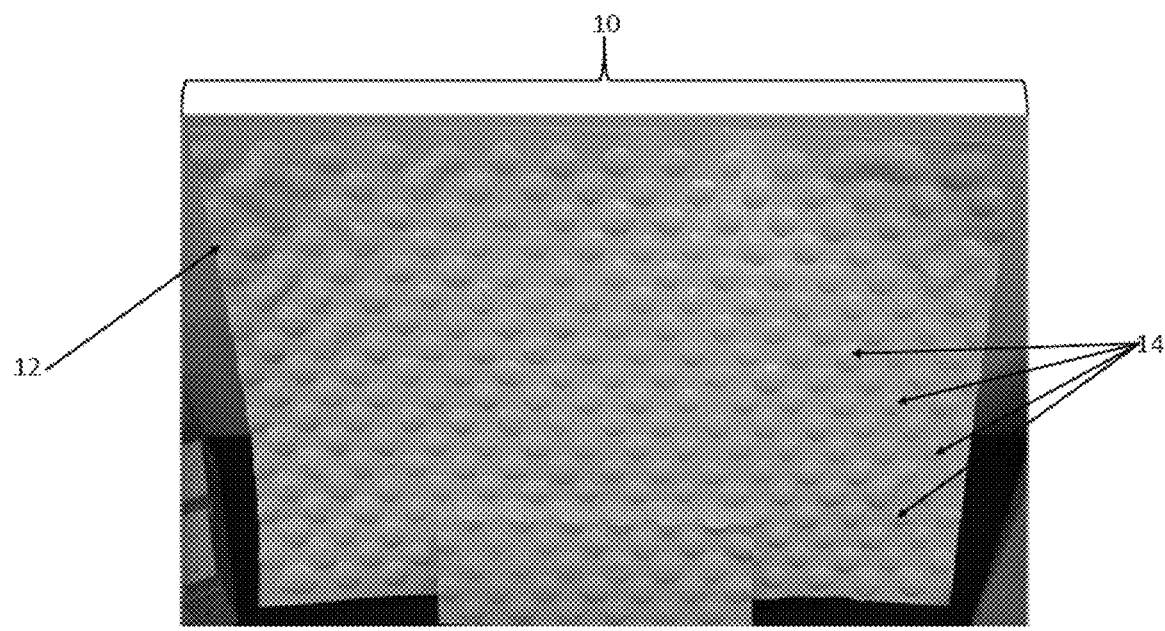
FIG. 2 depicts an exemplary embodiment of the roofing membrane of FIG. 1 after the roofing membrane has been exposed to a threshold temperature for a period of time, according to the present disclosure.

FIG. 2 depicts the roofing membrane 10 after the blowable ink has been expanded. In the exemplary embodiment of FIG. 2, the roofing membrane was exposed to a threshold temperature of 120° C. for approximately 1 minute. As shown in the exemplary embodiment of FIG. 2, following exposure to the threshold temperature, the first layer 12 includes a first plurality of protrusions 14.

Figure 3:
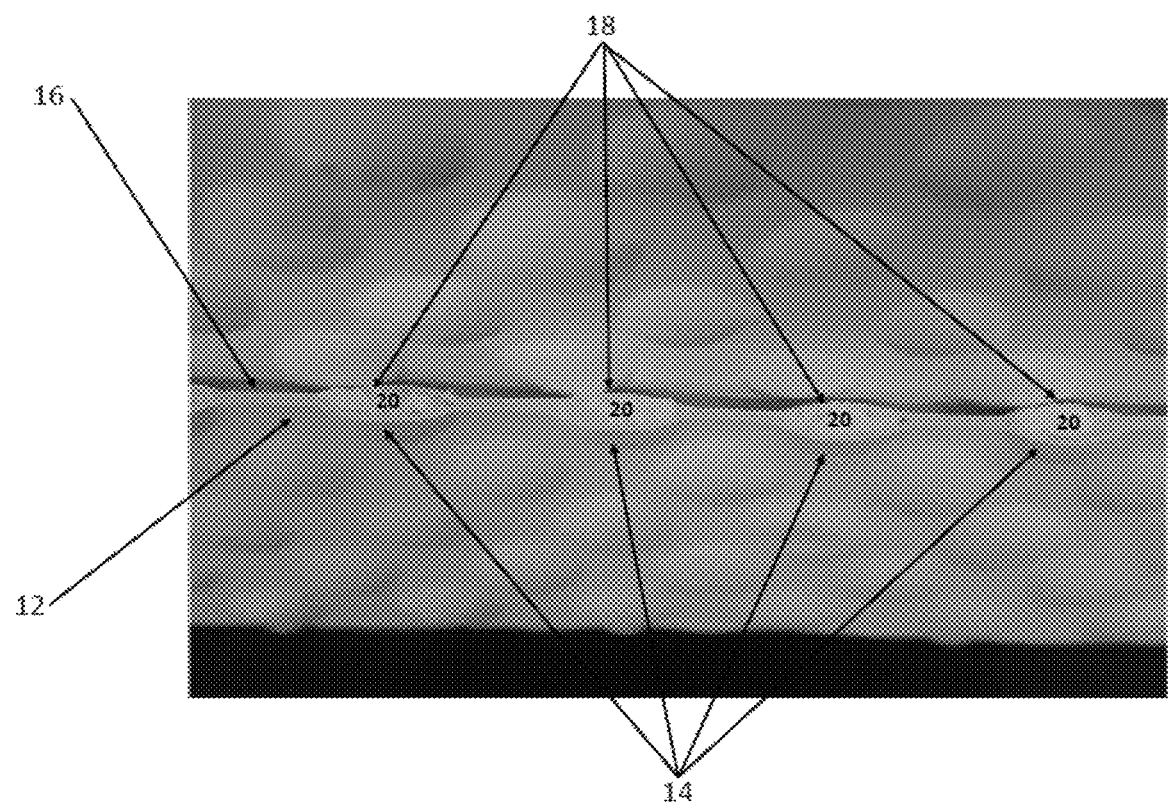
FIG. 3 depicts a cross-sectional view of the roofing membrane of FIG. 1 after the roofing membrane has been exposed to a threshold temperature for a period of time, according to the present disclosure.

FIG. 3 depicts a cross section of the roofing membrane 10 after the blowable ink has been expanded. As shown in FIG. 3, the first layer 12 includes the first plurality of protrusions 14, the second layer 16 includes a second plurality of protrusions 18, and a plurality of inner regions 20 are disposed between the first and second layers. In the exemplary embodiment of FIG. 3, the inner regions 20 are enclosed by respective ones of the first plurality of protrusions 14 and the second plurality of protrusions 18. In addition, in the exemplary embodiment of FIG. 3, the inner regions 20 comprise a foam. In the exemplary embodiment of FIG. 3, the foam is formed by expanding the blowable ink. However, the exemplary embodiment of FIG. 3 is not intended to be limiting, such that the inner regions 20 may not comprise a foam if a different type of blowable ink is used. For instance, in some embodiments, inner regions 20 may be hollow, such as, but not limited to when inner regions 20 are formed by a method of using a blowable ink, where the blowable ink increases in volume by releasing a gas, by transforming from a liquid to a gas, or any combination thereof, as described herein, infra.

Figure 4:
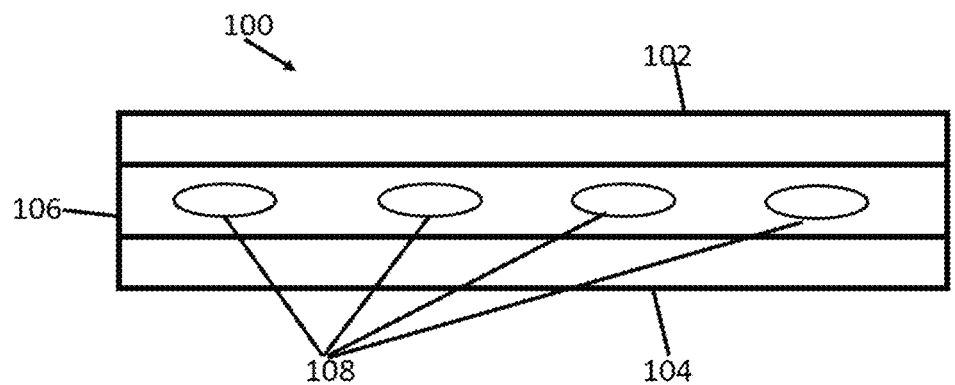
FIG. 4 depicts an exemplary embodiment of a roofing membrane according to the present disclosure.

FIG. 4 depicts a cross section of a roofing membrane 100 according to an exemplary embodiment of the present disclosure. As shown in FIG. 4, in some embodiments, the roofing membrane 100 includes a first layer 102 comprising a first liquid applied roof coating. In some embodiments, the roofing membrane 100 includes a second layer 104 comprising a second liquid applied roof coating. In some embodiments, the roofing membrane 100 comprises a porous layer 106. In some embodiments, the porous layer 106 may be between the first layer 102 and the second layer 104. In some embodiments, the porous layer may comprise blowable ink 108.

Figure 5:
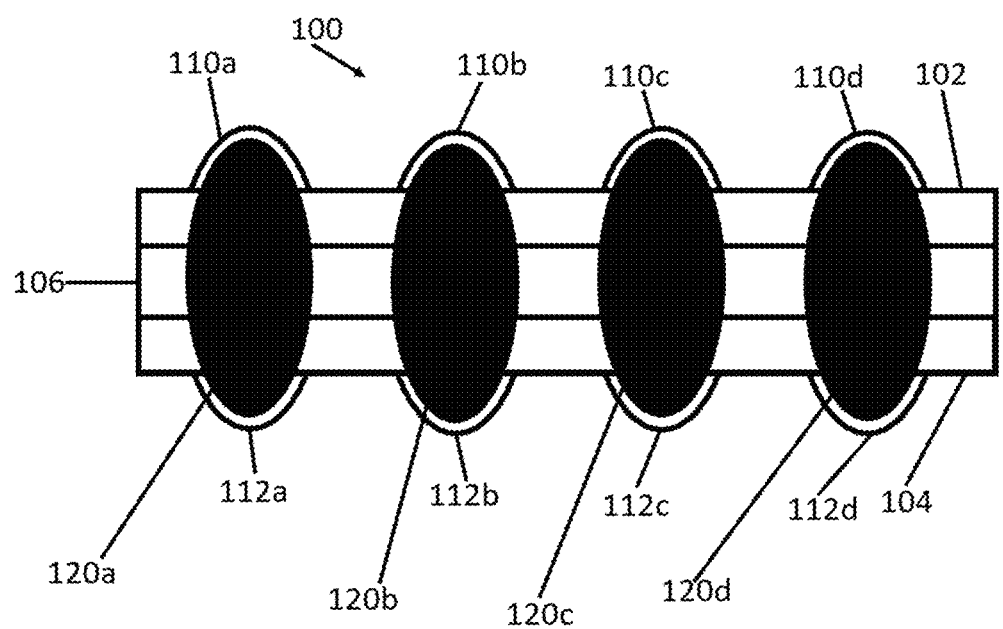
FIG. 5 depicts an exemplary embodiment of the roofing membrane of FIG. 4 after the roofing membrane has been exposed to a threshold temperature for a period of time, according to the present disclosure.

FIG. 5 depicts a cross section of the roofing membrane 100 of FIG. 4 that was exposed to a threshold temperature for a period of time. In some embodiments, the roofing membrane 100 is configured to be applied to a roof substrate. In some embodiments, the first layer 102 of the roofing membrane comprises a first plurality of raised protrusions 110a, 110b, 110c, 110d. In some embodiments, the second layer 104 of the roofing membrane comprises a second plurality of raised protrusions 112a, 112b, 112c, 112d. As shown in FIG. 5, in some embodiments, the roofing membrane 100 comprises a plurality of inner regions 120a, 120b, 120c, 120d. In some embodiments, the plurality of inner regions 120a, 120b, 120c, 120d are foam, hollow, or any combination thereof. In some embodiments, at least one of the plurality of inner regions 120a, 120b, 120c, 120d extends through at least a portion of the porous layer 106. In some embodiments, a first one of the plurality of inner regions 120a forms a first one of first plurality of raised protrusions 110a and a first one of the second plurality of raised protrusions 112a. In some embodiments, a second one of the plurality of inner regions 120b forms a second one of first plurality of raised protrusions 110b and a second one of the second plurality of raised protrusions 112b. In some embodiments, a third one of the plurality of inner regions 120c forms a third one of first plurality of raised protrusions 110c and a third one of the second plurality of raised protrusions 112c. In some embodiments, a fourth one of the plurality of inner regions 120d forms a fourth one of first plurality of raised protrusions 110d and a fourth one of the second plurality of raised protrusions 112d. In some embodiments, the roofing membrane 100 comprises more than four inner regions, more than four ones of the first plurality of raised protrusion, and more than four ones of the second plurality of raised protrusions. In some embodiments, the roofing membrane 100 comprises less than four inner regions, less than four ones of the first plurality of raised protrusion, and less than four ones of the second plurality of raised protrusions. In some embodiments, the number of inner regions is equal to the number of the first plurality of raised protrusions and is equal to the number of the second plurality of raised protrusions.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed:

1. A roofing membrane comprising:
   a first layer comprising
      a first liquid applied roof coating, and
      a first plurality of raised protrusions;
   a second layer comprising
      a second liquid applied roof coating, and
      a second plurality of raised protrusions;

a porous layer between the first layer and the second layer; and a plurality of inner regions,
wherein a first one of the plurality of inner regions forms a first one of the first plurality of raised protrusions and a first one of the second plurality of raised protrusions,
wherein a second one of the plurality of inner regions forms a second one of the first plurality of raised protrusions and a second one of the second plurality of raised protrusions,
wherein a third one of the plurality of inner regions forms a third one of the first plurality of raised protrusions and a third one of the second plurality of raised protrusions, and
wherein the plurality of inner regions are foam, hollow, or any combination thereof; and wherein the roofing membrane is configured to be applied to a roof substrate.

2. The roofing membrane of claim 1, wherein the porous layer is a woven or non-woven fabric, a scrim, a fleece, a mesh, open cell foams, or any combination thereof.

3. The roofing membrane of claim 1, wherein the first liquid applied roof coating comprises silicone, acrylic, polyurethane, epoxy, polymethylmethacrylate, silane terminated polymers, polyvinylidene fluoride, polyvinylidene difluoride, or any combination thereof.

4. The roofing membrane of claim 1, wherein the second liquid applied roof coating comprises silicone, acrylic, polyurethane, epoxy, polymethylmethacrylate, silane terminated polymers, polyvinylidene fluoride, polyvinylidene difluoride, or any combination thereof.

5. The roofing membrane of claim 1, wherein the first liquid applied roof coating and the second liquid applied roof coating are the same.

6. The roofing membrane of claim 1, wherein the first liquid applied roof coating and the second liquid applied roof coating are different.

7. A method comprising:
obtaining a porous layer,
wherein the porous layer has a top surface and a bottom surface;
applying a blowable ink onto at least a portion of the top surface of the porous layer or the bottom surface of the porous layer;
coating the top surface of the porous layer with a first liquid applied coating;
coating the bottom surface of the porous substrate with a second liquid applied coating;
expanding the blowable ink, so as to form:
a first plurality of protrusions;
a second plurality of protrusions; and
a plurality of inner regions,
wherein each of the plurality of inner regions is disposed between the first liquid applied coating and the second liquid applied coating and extend through the porous substrate.

8. The method of claim 7, wherein the at least one the porous layer is a woven or non-woven fabric, a scrim, a fleece, a mesh, or open cell foams.

9. The method of claim 7, wherein the at least one porous layer is configured to at least partially absorb the blowable ink.

10. The method of claim 7, wherein the first liquid applied coating is the same as the second liquid applied coating.

11. The method of claim 7, wherein the first liquid applied coating is different from the second liquid applied coating.

12. The method of claim 7, wherein the first liquid applied roof coating comprises silicone, acrylic, polyurethane, epoxy, polymethylmethacrylate, silane terminated polymers, polyvinylidene fluoride, polyvinylidene difluoride, or any combination thereof.

13. The method of claim 7, wherein the second liquid applied roof coating comprises silicone, acrylic, polyurethane, epoxy, polymethylmethacrylate, silane terminated polymers, polyvinylidene fluoride, polyvinylidene difluoride, or any combination thereof.

14. The method of claim 7, wherein the plurality of inner regions comprises foam.

15. The method of claim 7, wherein the plurality of inner regions is hollow.

16. The method of claim 7, wherein expanding the blowable ink includes heating the blowable ink at a temperature from 100° C. to 150° C.

17. The method of claim 7, wherein expanding the blowable ink includes heating the blowable ink from 1 minute to 5 minutes.

* * * * *